March 24, 1942.  W. C. McCOY  2,277,554
OVERLOAD RELEASING MECHANISM
Filed Sept. 12, 1940  5 Sheets-Sheet 1
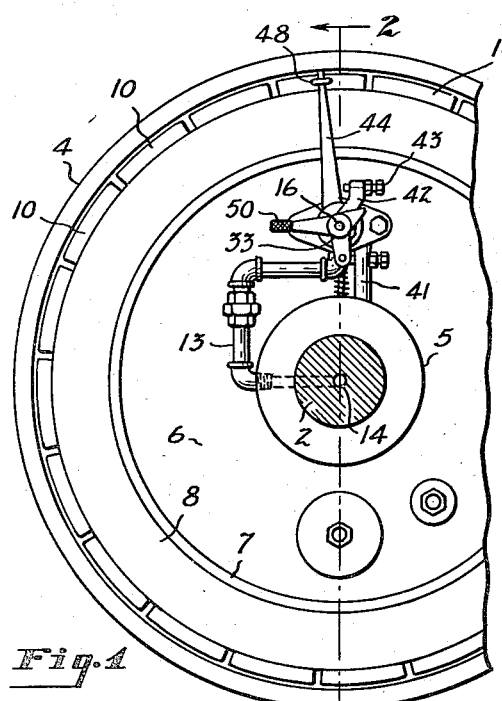
Fig. 1
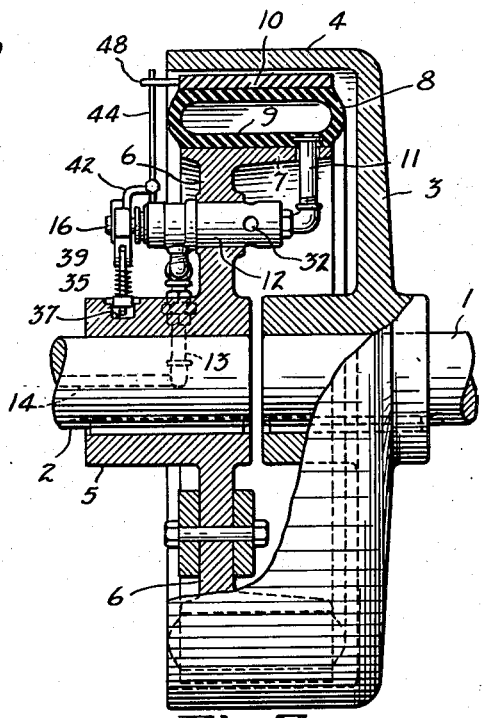
Fig. 2
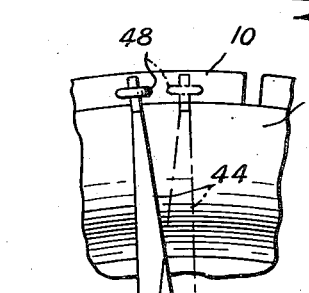
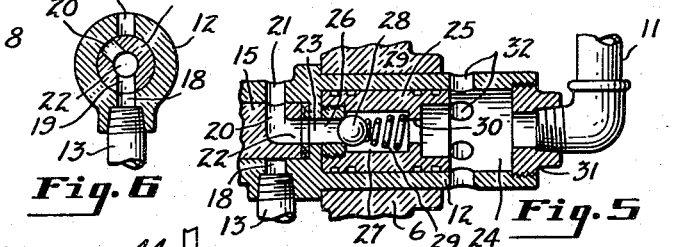
Fig. 5
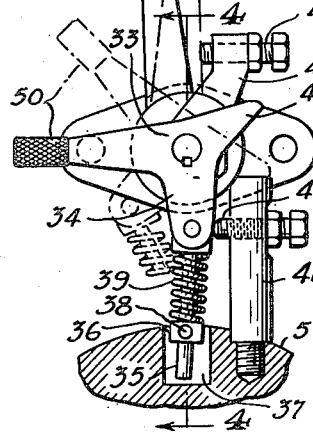
Fig. 3
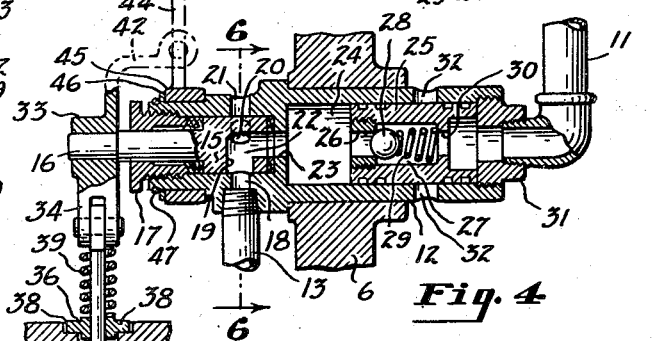
Fig. 4
INVENTOR
William C. McCoy
BY Evans + McCoy
ATTORNEYS

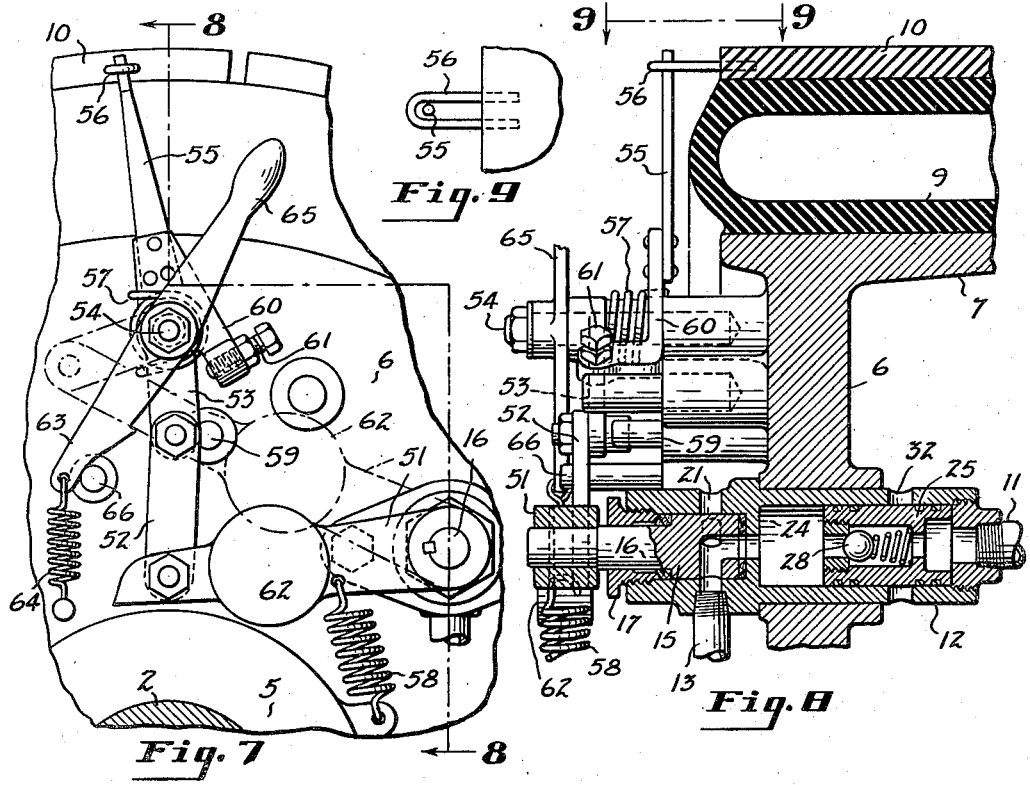
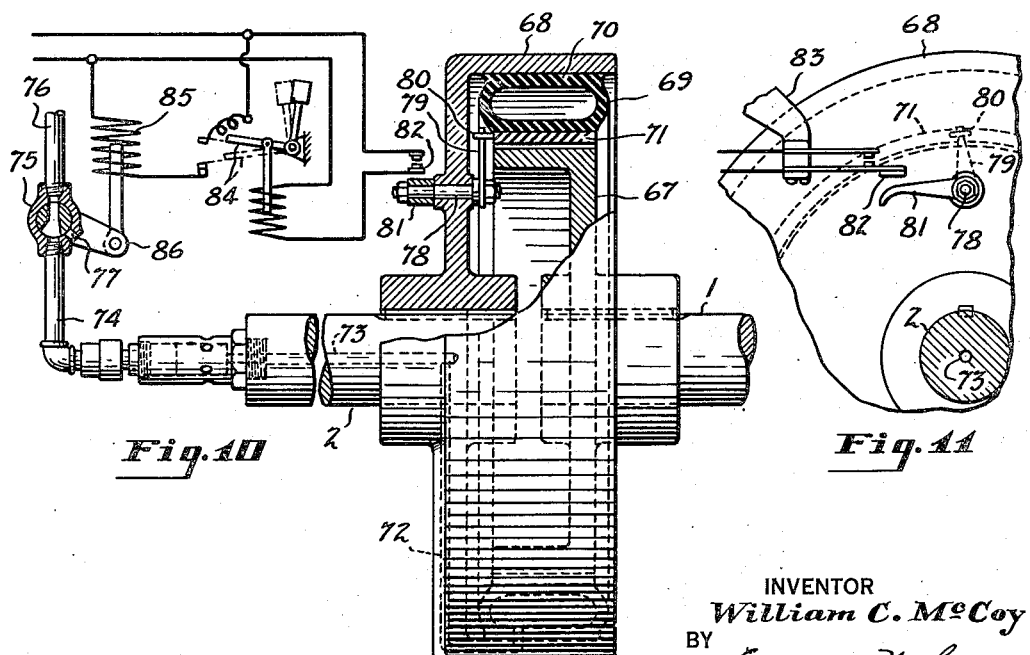

March 24, 1942.    W. C. McCOY    2,277,554
OVERLOAD RELEASING MECHANISM
Filed Sept. 12, 1940    5 Sheets-Sheet 3
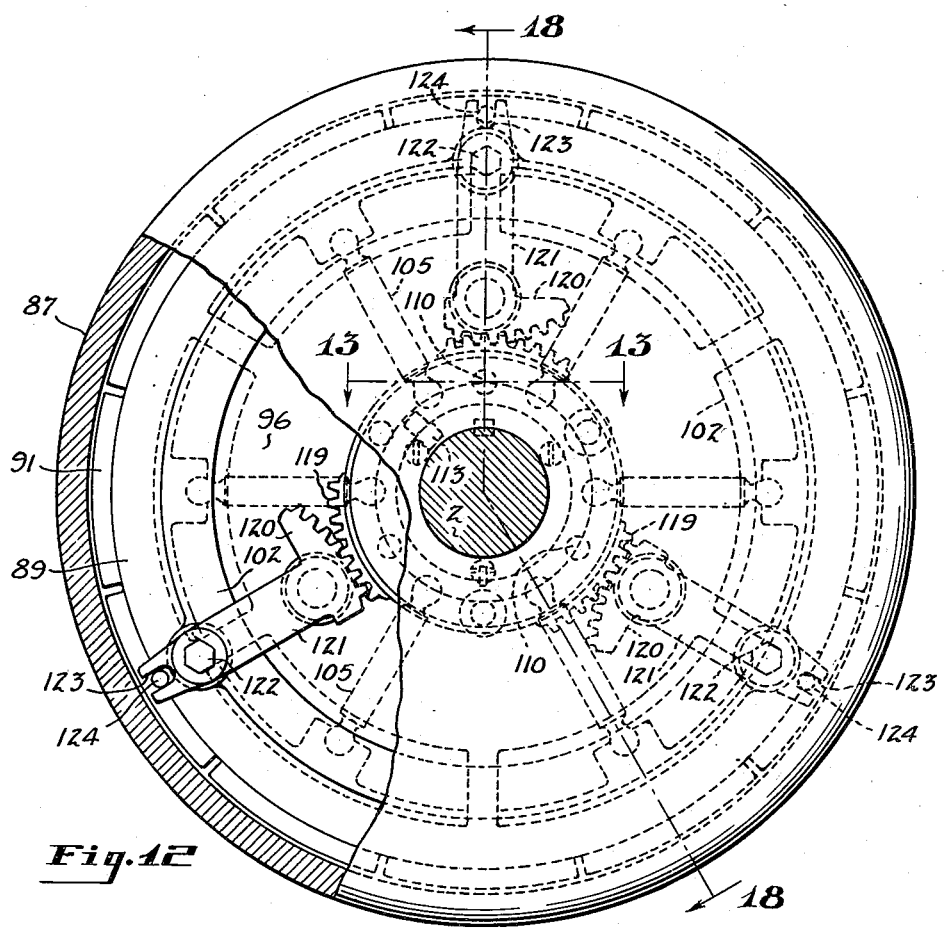
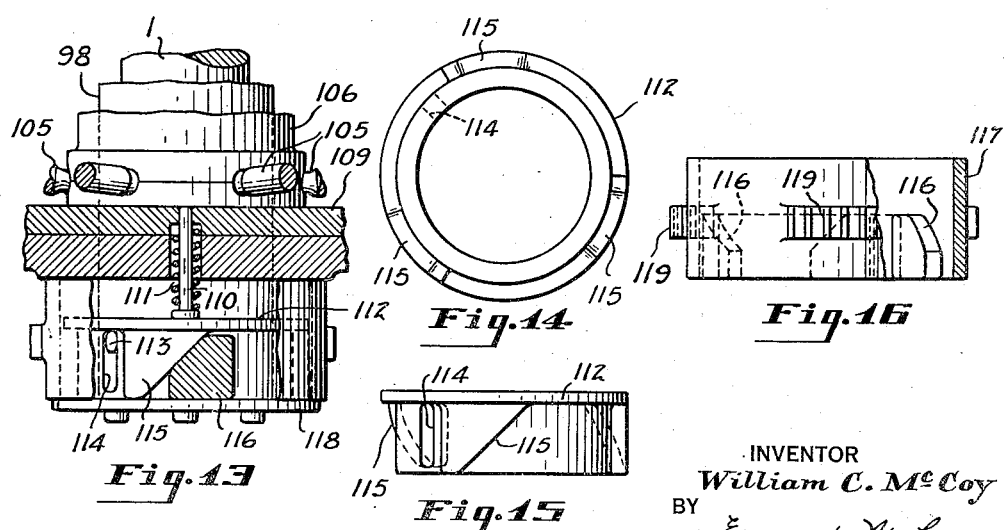
INVENTOR
William C. McCoy
BY Evans + McCoy
ATTORNEYS March 24, 1942. W. C. McCOY 2,277,554
OVERLOAD RELEASING MECHANISM
Filed Sept. 12, 1940 5 Sheets-Sheet 4
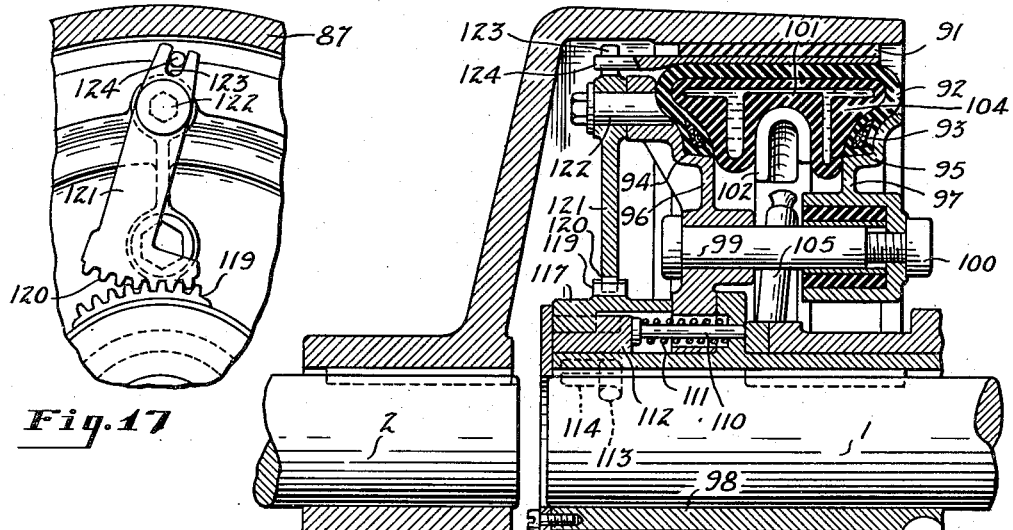
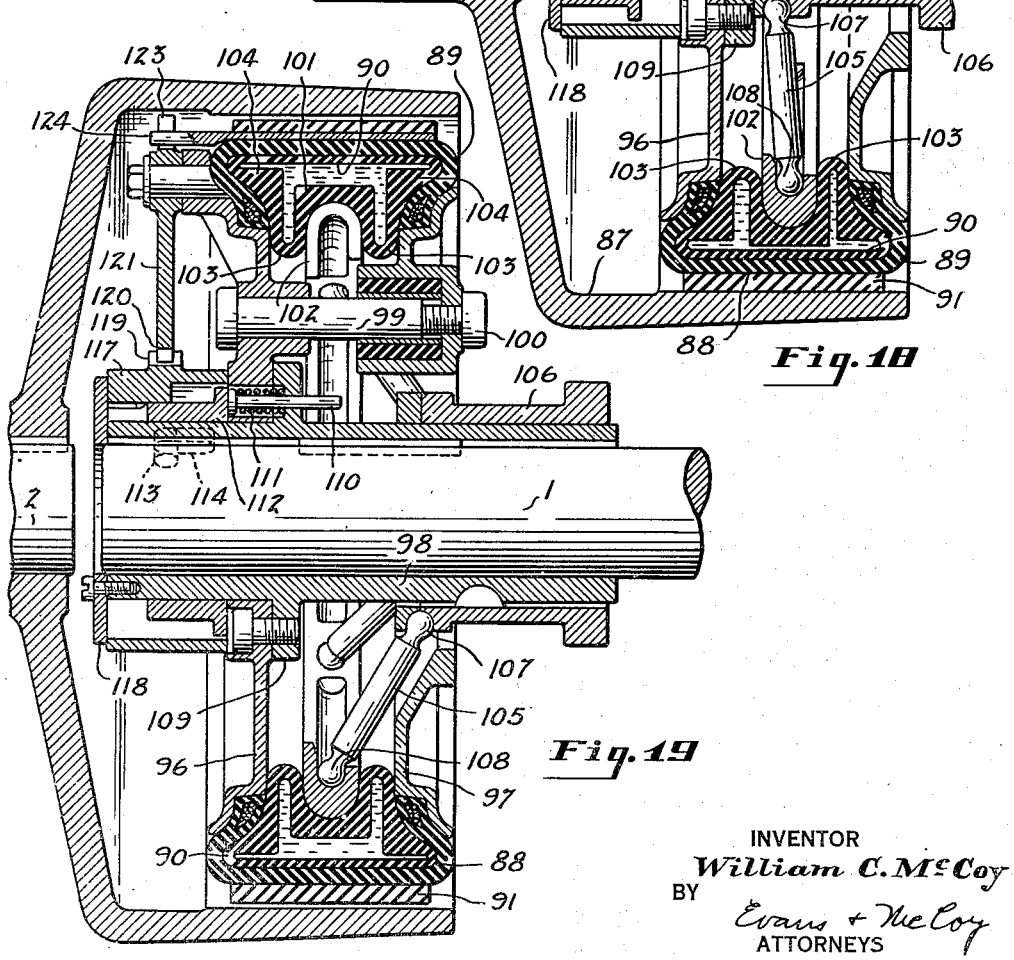

March 24, 1942. W. C. McCOY 2,277,554
OVERLOAD RELEASING MECHANISM
Filed Sept. 12, 1940 5 Sheets-Sheet 5

INVENTOR
William C. McCoy
BY Evans & McCoy
ATTORNEYS

Patented Mar. 24, 1942

2,277,554

UNITED STATES PATENT OFFICE 2,277,554

OVERLOAD RELEASING MECHANISM

William C. McCoy, Shaker Heights, Ohio, assignor to The General Tire & Rubber Company, Akron, Ohio, a corporation of Ohio Application September 12, 1940, Serial No. 356,421

15 Claims. (Cl. 192—56)

This invention relates to driving mechanisms and more particularly to driving mechanisms having rotatable driving and driven members connected by a flexible torque transmitting connection.

The present invention has for its object to utilize a flexible torque transmitting connection between driving and driven members to automatically control the application of driving force to the driven members in such manner as to discontinue the application of driving torque to the driven member when the applied torque exceeds a predetermined maximum.

A further object of the invention is to provide an automatic control of the character referred to applied to a driving connection in which the torque is transmitted through a flexible inflated annulus.

A further object is to provide a drive control which is responsive to relative circumferential movements of portions of the inflatable annulus through which connections are made with the driving and driven members.

A further object of the invention is to provide a clutch of the inflatable shoe type which is automatically released when overloaded.

A further object is to provide an overload drive control which is not affected by starting torque but which becomes effective after the driven member attains a predetermined speed of rotation.

With the above and other objects in view the invention may be said to comprise the device as illustrated in the accompanying drawings hereinafter described and particularly set forth in the appended claims, together with such variations and modifications thereof as will be apparent to one skilled in the art to which the invention appertains. Reference should be had to the accompanying drawings forming a part of this specification, in which:

Figure 1 is a fragmentary side elevation of a fluid pressure clutch embodying the invention;

Fig. 2 is an axial section taken on the line indicated at 2—2 in Fig. 1;

Fig. 3 is a side elevation on an enlarged scale of the control valve actuating mechanism;

Fig. 4 is an axial section taken on the line indicated at 4—4 of Fig. 3, showing the control valve in clutch-engaging position;

Fig. 5 is a section corresponding to that shown in Fig. 3, showing the control valve in the clutch releasing position;

Fig. 6 is a section taken on the line indicated at 6—6 in Fig. 4;

Fig. 7 is a fragmentary side elevation showing a modified form of valve controlling mechanism;

Fig. 8 is a fragmentary axial section taken on the line indicated at 8—8 in Fig. 7;

Fig. 9 is a detail view showing the actuating member attached to the drum engaging tread portion of the inflatable shoe;

Fig. 10 is a view partly in elevation and partly in section showing an embodiment of the invention in which a valve actuator is controlled by an electric switch;

Fig. 11 is a fragmentary side elevation of the switch and switch actuating means;

Fig. 12 is a side elevation showing the invention applied to a mechanically actuated fluid pressure clutch;

Fig. 13 is a section taken on the line indicated at 13—13 in Fig. 12;

Fig. 14 is a plan view of the clutch releasing collar;

Fig. 15 is a side elevation of the collar shown in Fig. 14;

Fig. 16 is a side elevation of the collar actuating ring with a part thereof broken away and shown in section;

Fig. 17 is a fragmentary side elevation of one of the ring actuating levers;

Fig. 18 is a section taken on the line indicated at 18—18 in Fig. 12 showing the clutch engaged;

Fig. 19 is a section similar to Fig. 18 showing the clutch disengaged; and

Figure 20:
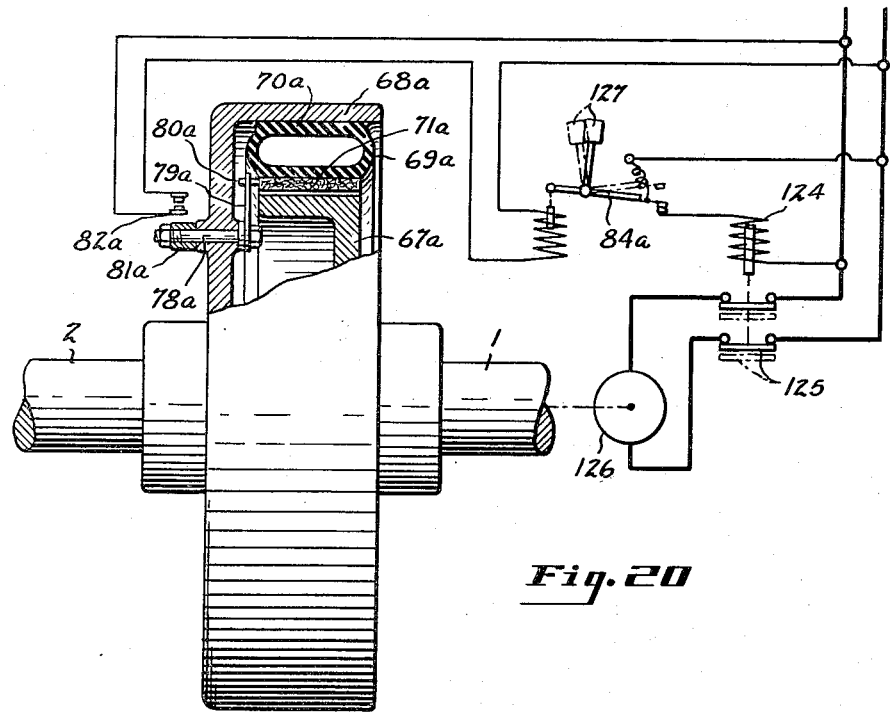
Fig. 20 shows a further modification of the invention in which the control of the application of driving force to the driven member is effected by controlling the application of power to the driving member.

The present invention utilizes the distortion created in a flexible torque transmitting member interposed between a driving member and a driven member when subjected to excessive load to interrupt the transmission of driving force to the driven member. In the preferred form of the invention the flexible torque transmitting member is an expansible shoe containing fluid under pressure and the transmission of driving force is interrupted by controlling the pressure within the shoe to break the driving connection. However, the invention contemplates the utilization of the distortion of the flexible torque transmitting member to control a motor or other prime mover by which the mechanism is driven as is shown in Fig. 20 of the drawings.

Referring to Figs. 1 to 6 of the drawings, the invention is shown applied to a clutch of the inflatable shoe type interposed between a driving shaft 1 and a driven shaft 2. The shaft 1 has a drum 3 attached thereto which has a cylindrical peripheral portion 4 which projects past the end of the shaft 1. The driven shaft 2 is positioned in substantially axial alignment with the shaft 1 and carries a supporting member having a hub 5 attached to the shaft 2, a web 6 and a rim portion 7 which supports a hollow annular shoe 8. The shoe 8 is a hollow annulus formed of rubber having an interior base portion 9 attached to the rim 7 of the supporting member and an exterior tread 10 which is adapted to engage with the interior of the drum 3. The shoe 8 is molded to a transversely elongated cross sectional form with its tread portion of less diameter than the internal diameter of the drum so that when uninflated the tread portion 10 is of less diameter than the drum and is out of engagement with the drum. However, when the fluid under pressure is supplied to the interior of the drum the tread 10 is expanded and pressed by fluid pressure against the interior of the drum. To supply pressure to the interior of the shoe the shoe 8 is provided with a stem 11 which is connected to the base portion of the shoe, extends through the rim 7 and is connected to a valve casing 12. A pipe 13 connected to the valve casing 12 communicates with an axial passage 14 in the shaft 2 through which air under pressure may be supplied from a suitable source. The valve casing 12 is mounted in the web 6 of the shoe supporting member and extends through the said web. The outer end of the casing 12 is bored to receive a rotary control valve 15 which has a stem 16 which extends through a gland 17 mounted in the outer end of the casing 12. The casing 12 has a port 18 which establishes communication with the air pipe 13 and the valve has a radial passage 19 adapted to register in one position of the valve with the port 18. The valve has a second radial passage 20 which is adapted to register in another position of the valve with an exhaust port 21 in the casing 12. The valve 15 has an axial outlet 22 extending from the radial passages 19 and 20 to the inner end of the valve and registering with an aperture 23 in the casing 12 which opens into an enlarged cylindrical chamber 24. A floating piston valve 25 is mounted in the chamber 24. The piston valve 25 is provided with an axial passage which includes an opening 26 at its outer end and an enlarged chamber 27 in which is mounted a ball check valve 28 which is pressed against the opening 26 by a spring 29. At its inner end the valve 25 has an opening 30 through which air forced past the ball check valve passes to the outer end of the chamber 24 and through the stem 11 to the interior of the shoe, the stem 11 being attached to a head 31 which closes the inner end of the chamber 24. When the valve 15 is in the position shown in Figs. 4 and 6, air under pressure is admitted from the pipe 13 to the outer end of the chamber 24 and this pressure acting against the outer end of the piston valve 25 holds the piston valve 25 against the head 31 and at the inner end of the chamber 24. By reason of the check valve 28 pressure in the outer end of the chamber 24 is slightly in excess of the pressure at the inner end of the chamber and this excess pressure is ample to normally hold the valve 25 in its innermost position. In this position of the valve 25 the outer end of the chamber 24 receives air under pressure from the pipe 13 and maintains pressure in the shoe 8 only slightly less than the pressure existing in the line 13. If the valve 15 be turned in a clockwise direction from the position shown in Fig. 6, to cause the radial passage 20 to register with the outlet port 21, the inlet port 18 is closed and the air within the outer end of the chamber 24 is permitted to escape through outlet 21 to the atmosphere. The release of pressure in the outer end of the chamber 24 causes the piston 25 to be moved to the outer end of the chamber, in which position of the piston valve a series of exhaust ports 32 adjacent the inner end of the casing 12 are opened permitting air to escape from the shoe 8 to the atmosphere. The deflation of the shoe 8 will cause the tread 10 to be drawn inwardly out of contact with the drum 3 and break the driving connection.

In accordance with the present invention means is provided for automatically actuating the valve 15 when an excessive load is imposed upon the driven shaft 2. The automatic valve actuating means will now be described:

An actuating member 33 is fixed to the outer end of the valve stem 16. This member is provided with an arm 34 which projects radially inwardly. The inner end of the arm 34 is pivoted to a pin 35 which extends through a guide 36 mounted in a recess 37 in the hub 5 of the shoe supporting member, the guide 36 being supported on trunnions 38 to permit rocking movements of the pin 35. The arm 34 and pin 35 form a toggle interposed between the hub 5 and the valve stem 16, and a spring 39 interposed between the guide 36 and the outer end portion of the pin 35 exerts a thrust on the toggle pivot, tending to swing the arm 34 in either direction from the dead center position. In the normal position of the valve 15 the toggle is close to its dead center position, being held against an adjustable stop 40 which is in the form of a screw carried by a post 41 attached to the head 5. The stop 40 is so positioned as to permit the arm 34 to swing slightly past dead center position so that the spring 39 will act to retain the arm 34 in engagement with the stop 40, in which position of the arm the valve 15 connects the chamber 24 with the supply pipe 13 to maintain pressure in the shoe 8. The actuating member 33 is provided with an outwardly projecting laterally offset arm 42 which carries an adjustable stop member 43 which may be in the form of a screw, which is so positioned as to be in the path of movement of the trip arm 44 through which movement may be imparted to the actuating member 33. The trip arm 44 is pivoted to swing about the axis of the stem 16, being provided with a bearing ring 45 mounted upon the exterior of the casing 12, the bearing ring 45 being held in place by a washer 46 and a locking ring 47. The outer end of the trip arm 44 is engaged by a yoke 48 which is fixed to the tread portion of the shoe 8. Whenever an excessive load is imposed upon the driven shaft the increased torsional thrust exerted through the flexible side walls of the annular shoe 8 will cause the tread portion 10 of the shoe to be moved circumferentially with respect to the base portion which is fixed to the supporting member which carries the valve casing 12. The relative angular movement of the yoke 48 with respect to the casing 12 will impart an angular movement to the trip arm 44. When this angular movement is in excess of a predetermined amount the trip arm 44 will engage with the adjustable stop member 43, causing a rocking movement of the actuator 33 sufficient to move the arm 44 away from the stop 40 against which it is normally held and past dead center position, whereupon the spring 39 will move the arm 34 through a sufficient angle to connect the chamber 24 with the exhaust port 21, thereby causing actuation of the piston valve 25 and to release the pressure within the shoe 8. The extent of movement of the arm 34 outwardly away from the stop 40 is limited by a stop arm 49 attached to the actuator 33 and engageable with the outer end of the post 41. The actuator may also be provided with a handle 50 by means of which the trip mechanism may be manually reset.

In the modification above described a predetermined torsional thrust exerted through the shoe 8 will cause a circumferentially shifting of the tread portion 10 of the shoe sufficient to trip the valve actuating mechanism and disengage the clutch. In some installations it may be desirable to disengage the machine from its driving mechanism, when operating at full speed in case the driving mechanism should be subjected to overloads which are less than the overloads to which the driving mechanism may be subjected in starting the machinery into operation. In Figs. 7 and 8 of the drawings there is shown a trip mechanism applied to a controlling valve of the same construction as that previously described which is designed to operate only when the driven member is rotating at substantially full speed, the trip device being unaffected by overloads due to the inertia of the moving parts in starting. In this modification an actuating arm 51 is fixed to the valve stem 16 and the outer end of this arm is pivoted to a toggle link 52 which is pivotally connected to a second toggle link 53 which is pivoted at its outer end to a shaft 54 fixed to the web 6 of the shoe supporting member. A trip arm 55 is also pivoted to the shaft 54 at its inner end and its outer end is engaged by a yoke 56 fixed to the tread portion 10 of the shoe. The toggle link 53 and the trip arm 55 are both freely rotatable on the shaft 54 and are connected by a coil spring 57 on the shaft 54 which has one end attached to the link 53 and its other end attached to the trip arm 55. A spring 58 is attached at one end to the arm 51 and at its opposite end to the hub 5 of the supporting member so as to normally hold the arm 51 in its innermost position with the toggle links 52 and 53 in substantially dead center position. The spring 57 acting on the outer link 52 of the toggle serves to normally hold the toggle with its pivot slightly past its dead center position, and the link 53 in engagement with a stop pin 59 carried by the web 6. The spring 58 serves to normally hold the arm 51 in its innermost position and to exert an endwise pull on the toggle links 52 and 53 tending to hold them in alignment, while the spring 57 exerts sufficient lateral pressure on the link 53 to move the toggle pivot slightly past dead center position and hold the link 53 against the stop 59. The trip arm 55 has a laterally offset arm 60 which carries an adjustable toggle engaging member in the form of a screw 61 which is adapted, upon a predetermined movement of the arm 55 to engage with the link 53 and move the same away from the stop 59 a sufficient distance to shift the toggle pivot past dead center position so that an outward thrust exerted upon the arm 51 may move the arm 51 to the dotted line position shown in Fig. 7 to shift the valve 15 to shoe releasing position. A weight 62 is attached to the arm 51 and this weight exerts an outward thrust due to centrifugal force when the driven member is rotated. When the driven member attains a predetermined speed of rotation, the outward force exerted by the weight 62 is sufficient to move the arm 51 outwardly against the action of the spring 58 whenever the toggle formed by the links 52 and 53 is broken by operation of the lever 55 under overload conditions. Breaking of the toggle by the trip arm 55 while the machine is being started will not cause actuation of the valve because the outward force exerted by the weight 62 will not be sufficient to overcome the action of the spring 58. However, when the driven member attains operating speed an overload sufficient to actuate the trip arm 55 and break the toggle will release the arm 51, and centrifugal force acting on the weight 62 will throw the arm outwardly to move the valve 15 to shoe releasing position. In order to prevent automatic reengagement of the clutch as the driven member slows down after release of the clutch, a suitable latch may be provided for retaining the arm 51 in clutch releasing position. The latch 63 is pivoted on the shaft 54 and backed by coil spring 64, being so positioned as to engage with the outer end of the arm 51 to retain it in its outermost position. The latch 63 may be provided with a handle 65 by means of which it may be actuated to release the arm 51 and the latch may be positioned for engagement with the arm 51 by means of the stop member 66 fixed to the web 6 and against which the latch 63 is held by the spring 64.

In Figs. 10 and 11 of the drawings a modification of the invention is shown in which a drum 67 is attached to the driving shaft 1 and a drum 68 to the driven shaft 2. An annular inflatable shoe 69 has an exterior base portion 70 attached to the interior of the drum 68 and an interior tread portion 71 which is engageable with the exterior surface of the drum 67. Air under pressure may be supplied to the interior of the shoe 69 through a passage 72 in the drum 68 which communicates with an axial passage 73 in the driven shaft 2 which is connected through a suitable fitting with a pipe 74 which communicates through a valve 75 with a pipe 76 which may be connected to a suitable source of air under pressure. The valve 75 is a valve of the rotary type having a transverse passage so formed that in one position of the valve communication is established between the pipes 74 and 76 and in the other position of the valve communication is established between the pipe 74 and an exhaust port 77 in the valve casing. In one position of the valve pressure is maintained within the shoe 69 and in the other position of the valve pressure within the shoe is released. An axially disposed shaft 78 is mounted in the web of the drum 68. To the inner end of this shaft is fixed an outwardly projecting arm 79 which is engaged at its outer end by a yoke 80 fixed to the tread portion 71 of the shoe 69. Exteriorly of the drum the shaft 78 carries a trip arm 81 which is normally positioned inwardly of the movable contact member of a switch 82 carried by a stationary bracket 83. When excessive torsional load is imposed upon the shoe 69 an angular movement is imparted to the arm 79, shaft 78, and arm 81, moving the arm 81 outwardly a sufficient distance to cause the same to strike against the movable contact member of the switch 82 during rotation of the drum 68. The momentary closing of the switch 82 operates a relay switch 84 which closes the circuit through a solenoid 85 which is connected to an arm 86 attached to the valve 75. Energization of the solenoid 85 by engagement of the trip arm 81 with the switch 82 causes the valve 75 to be moved to pressure exhausting position, causing the air pressure to be released from the interior of the shoe 69, freeing the shoe 69 from the drum 67.

In Figs. 12 to 19 of the drawings the invention is shown applied to the clutch of the type in which fluid pressure within the clutch shoe is created by means of a manually operated thrust applying device. In this clutch the outer drum 87 is attached to the shaft 2 and within this drum there is mounted an expansible shoe 88 which comprises an outer casing 89 and an inner tube 90, the outer casing having a tread portion 91 engageable with the interior of the drum 87, short side walls 92 and bead portions 93 mounted in seats 94 and 95 formed in the rim portions of supporting disks 96 and 97. The inner supporting disk 96 is attached to a sleeve 98 fixed to the shaft 1 and the outer supporting disk 97 is supported by bolts 99 carried by the disk 96. The outer disk 97 is slidable upon the bolts 99 and may be adjusted by means of nuts 100 toward or away from the disk 96 to vary the clearance of the tread 91 with respect to the interior of the drum 87. The interior wall of the inner tube 90 has a thickened central portion 101 to which metal segments 102 are attached. On opposite sides of the metal segments 102 the inner tube has relatively thin flexible portions 103 extending inwardly between the disks 96 and 97. The portions of the inner tube adjacent the seats 93 are also thickened so as to restrict the lateral flexing of the inner tube to constrain the center portion of the tube to substantially radial outward or inward movement. The inner tube 90 is filled with liquid and pressure is created in the body of liquid within the tube by exerting the expanding force upon the central flexible portion 101 of the inner tube 90. Radial outward pressure is exerted upon the inner tube 90 by thrust members 105 which are interposed between a shifter collar 106 mounted for axial movement on the sleeve 98 and the segments 102, the thrust members 105 having ball ends 107 and 108 seated in suitable spherical recesses in the collar and segments. When the clutch is disengaged the collar 106 is in its outermost position and the thrust members 105 are at a substantial inclination to the vertical. As the collar 106 is moved inwardly by means of a suitable shift lever (not shown) the thrust members 105 are moved toward a position in which they lie in a plane perpendicular to the axis of the shaft 1. In the perpendicular position of the thrust members 105, the central portion 101 of the inner tube 90 is expanded to the maximum extent. Pressure exerted on the body of liquid within the tube by the expansion of the central portion of the inner walls of the inner tube 90 is transmitted to the tread portion 91 of the shoe, expanding the same into engagement with the drum 87. The inward movement of the collar 106 is limited by a flange 109 on the sleeve 98 and this flange is so positioned that thrust members 105 may be moved with the collar 106 slightly past their perpendicular position so that the contractile elasticity of the shoe positively holds the collar in its innermost position, in which position of the collar the shoe is held in engagement with the drum. In moving the collar 106 to disengage the clutch the initial movement is resisted by the shoe, but as soon as the thrust members 105 have been moved past their perpendicular or dead center position, the elastic shoe due to its stretch will exert an outward thrust on the actuating collar. The automatic releasing device of the present invention effects the release of the clutch by means of kick-out pins 110 mounted in the flange 109 disposed parallel with the shaft 1. The pins 110 are mounted for axial sliding movement in the flange 109 and are normally held in retracted position by means of a spring 111. Movement of the kick-out pins 110 is effected by means of an actuating collar 112 engaging the pins 110 and slidably mounted on the sleeve 98, the collar 112 being held against turning movement on the sleeve by means of a pin 113 carried by the sleeve 98 and engaging in a longitudinal slot 114 in the collar. The collar 112 has a cam portion 115 which is engaged by a cam 116 carried by a ring 117 which is rotatably mounted upon the sleeve 98 but which is held against sliding movement on the sleeve by means of a retaining disk 118. The ring 117 has external gear teeth 119 which are engaged by gear segments 120 carried by the inner ends of levers 121 which are pivoted intermediate their ends on pivots 122 fixed to the disk 96. The outer ends of the levers 121 are provided with slots 123 which receive pins 124 fixed to the tread portion 91 of the shoe. When the expansible shoe 88 is subjected to excessive torsional stress due to an overload, the levers 121 are rocked about the pivots 122 and turning movement is imparted to the ring 117 by means of the gear segments 120. Turning movements of the ring 117 moves the cam 116 across the inclined face of the cam portion 115 of the collar 112, causing the actuating collar 112 to slide on the sleeve 98 and forcing the kick-out pins 110 through the flange 109 against the collar 106, pushing the collar 106 outwardly a sufficient distance to move the thrust members 105 past their perpendicular or dead center position.

In the modification shown in Fig. 20 the inflatable torque transmitting element is utilized to control the motor or other prime mover which operates the driving shaft. The driving connection shown in this modification is like that shown in Figs. 10 and 11, the drum 67a being attached to the driving shaft 1 and the drum 68a to the driven shaft 2. The two drums are connected by an inflatable shoe 69a which has a base portion 70a attached to the drum 68a and a tread portion 71a engageable with the drum 67a. The shaft 78a is mounted in the drum 68a and has an arm 79a fixed thereto and engaging in a yoke 80a fixed to the tread portion of the shoe 69a. The shaft 78a has a trip arm 81a fixed to its outer end which in one position is adapted to strike against the movable contact arm of a switch 82a which operates a relay switch 84a which closes the circuit of a solenoid 124 which controls a switch 125 which opens and closes the circuit of a motor 126. When the driven shaft is overloaded the excessive torque exerted upon the shoe 69a actuates the trip arm 81a, moving it to a position where it engages the movable contact member of the switch 82a, momentarily closing the relay circuit to open the switch 84a and de-energize the solenoid 124 to open the switch 125 and stop the motor, the switch 84a being retained in open position until manually reset by a weight 127.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. In a driving mechanism which comprises a rotatable driving member, a substantially coaxial rotatable driven member, a connecting member in the form of a hollow fluid containing annulus having oppositely disposed wall portions adapted to be connected for rotation with the driving and driven members, respectively, and flexible torque transmitting wall portions connecting said oppositely disposed wall portions, and means operable upon a predetermined relative angular movement of one of said oppositely disposed wall portions of the annulus with respect to the other to control the transmission of driving force to the driven member.

2. In a driving mechanism which comprises a rotatable driving member, a substantially coaxial rotatable driven member, a clutch for connecting said members comprising a hollow fluid containing annulus having a peripheral wall attached to one of said members, its opposite peripheral wall engageable with the other of said members and flexible torque transmitting walls connecting said peripheral walls, means for controlling the pressure within said annulus to operate the clutch, and means operable upon a predetermined relative angular movement of one of said peripheral walls with respect to the other due to the torque load for actuating said pressure controlling means.

3. In a driving mechanism which comprises a rotatable driving member, a substantially coaxial rotatable driven member, a clutch for connecting said members comprising a hollow fluid containing annulus having a peripheral wall attached to one of said members, its opposite peripheral wall engageable with the other of said members and flexible torque transmitting walls connecting said peripheral walls, and automatic drive controlling means comprising a controlling element carried by the member to which the annulus is attached and an actuating member operatively associated with said controlling member and attached to said annulus adjacent the wall thereof which is engageable with the other of the rotatable members.

4. In a driving mechanism which comprises a rotatable driving member, a substantially coaxial rotatable driven member, a clutch for connecting said members comprising a hollow fluid containing annulus having a peripheral wall attached to one of said members, its opposite peripheral wall engageable with the other of said members and flexible torque transmitting walls connecting said peripheral walls, means for controlling the pressure within said annulus to operate the clutch, and means for controlling said pressure controlling means comprising a controlling element carried by the rotatable member to which the annulus is attached and an actuating member attached to the annulus and operatively associated with said controlling element.

5. The combination with a clutch comprising a drum, an inner rotatable member substantially concentric with the drum and a flexible elastic annular shoe carried by the inner member and rotatable therewith, said shoe having an exterior tread surface engageable with the drum, a circumferentially flexible body portion, an interior base portion attached to said inner member, of shoe expanding means for exerting radial outward pressure upon said shoe to expand the same into engagement with the interior of the drum, means carried by said inner member for controlling said pressure applying means, and means for actuating said controlling means including a member attached to said shoe adjacent the periphery thereof.

6. A driving mechanism comprising rotatable driving and driven members, a drum carried by one of said members, an inflatable annulus providing a driving connection between said members and having a peripheral tread portion engageable with the drum, a base portion spaced radially from said drum engaging tread portion and attached to the other of said members, and flexible torque transmitting side walls connecting the tread and base portions, and means operable upon a predetermined circumferential movement of the said tread portion of the annulus with respect to the base portion thereof for controlling the transmission of driving force to the driven member.

7. A driving mechanism comprising rotatable driving and driven members, a drum carried by one of said members, an inflatable annulus providing a driving connection between said members and having a peripheral tread portion engageable with the drum, a base portion spaced radially from said drum engaging tread portion and attached to the other of said members, and flexible torque transmitting side walls connecting the tread and base portions, means for varying the fluid pressure within said annulus to engage or disengage the annulus and drum, and means operably associated with said controlling means and operable upon a predetermined circumferential movement of said tread portion of the annulus with respect to the base portion thereof for controlling said pressure varying means to disengage the annulus from the drum.

8. A driving mechanism comprising rotatable driving and driven members, a drum carried by one of said members, an inflatable annulus providing a driving connection between said members and having a peripheral tread portion engageable with the drum, a base portion spaced radially from said drum engaging tread portion and atached to the other of said members, and flexible torque transmitting side walls connecting the tread and base portions, valve controlled means for relieving the fluid pressure in the annulus to disengage the annulus from the drum, and means operable upon a predetermined circumferential movement of the tread portion of the annulus with respect to the base portion thereof to actuate said valve.

9. A driving mechanism comprising rotatable driving and driven members, a drum carried by one of said members, an inflatable annulus providing a driving connection between said members and having a peripheral tread portion engageable with the drum, a base portion spaced radially from said drum engaging tread portion and attached to the other of said members, and flexible torque transmitting side walls connecting the tread and base portions, means for increasing or decreasing the fluid pressure within the annulus for engaging the annulus with the drum or disengaging the same from the drum, manually operable means for controlling said pressure varying means, and means including a member attached to the annulus adjacent the tread portion thereof for automatically actuating said controlling means upon a predetermined circumferential movement of said tread portion of the annulus with respect to the base portion thereof.

10. A driving mechanism comprising a rotatable driving shaft, a drum attached to said driving shaft, a driven shaft, an annular expansible shoe having a base portion attached to said driven shaft and a tread portion spaced radially from said base portion and engageable with said drum, said shoe having a circumferentially flexible torque transmitting body portion between the base and tread portion thereof, means for expanding the shoe to engage the tread portion thereof with the drum, and means operable upon a predetermined circumferential movement of the said tread portion of the annulus with respect to the base portion thereof for controlling the transmission of driving force to the driven member.

11. A driving mechanism comprising a rotatable driving shaft, a drum attached to said driving shaft, a driven shaft, an annular expansible shoe having a base portion attached to said driven shaft and a tread portion spaced radially from said base portion and engageable with said drum, said shoe having a circumferentially flexible torque transmitting body portion between the base and tread portion thereof, means for expanding the shoe to engage the tread portion thereof with the drum, means carried by the driven member for controlling the transmission of driving force to the driven member, and means for actuating said controlling means comprising an actuating member attached to said shoe, a second actuating member mounted on the driven member, and means controlled by the speed of rotation of the driven member for controlling the operation of said actuating members.

12. A driving mechanism comprising a rotatable driving shaft, a drum attached to said driving shaft, a driven shaft, an annular expansible shoe having a base portion attached to said driven shaft and a tread portion spaced radially from said base portion and engageable with said drum, said shoe having a circumferentially flexible torque transmitting body portion between the base and tread portion thereof, means for expanding the shoe to engage the tread portion thereof with the drum, means carried by the driven member for controlling the transmission of driving force to the driven member, speed controlled means for actuating said controlling means, and means carried by said shoe for controlling the operation of said speed controlled means.

13. A driving mechanism comprising a rotatable driving shaft, a drum attached to said driving shaft, a driven shaft, an annular expansible shoe having a base portion attached to said driven shaft and a tread portion spaced radially from said base portion and engageable with said drum, said shoe having a circumferentially flexible torque transmitting body portion between the base and tread portion thereof, means for expanding the shoe to engage the tread portion thereof with the drum, means carried by the driven member for controlling the transmission of driving force to the driven member, an actuator for said controlling means carried by the driven member movable by centrifugal force upon a predetermined speed of rotation, means for normally holding said actuator against movement, and means operable upon a predetermined movement of the tread portion of the shoe with respect to the base portion thereof for releasing said actuator.

14. A driving mechanism comprising rotatable driving and driven members, a drum carried by one of said members, an inflatable annulus providing a driving connection between said members and having a peripheral tread portion engageable with the drum, a base portion spaced radially from said drum engaging tread portion and attached to the other of said members, and flexible torque transmitting side walls connecting the tread and base portions, means for varying the fluid pressure within said annulus to engage or disengage the annulus and drum, an actuator operably connected to said pressure varying means, said actuator being carried by the driven member and movable by centrifugal force upon a predetermined speed of rotation in a direction to release the pressure in said annulus, and operable upon a predetermined movement of the tread portion of the annulus with respect to the base portion thereof for releasing said actuator.

15. In a driving mechanism, a rotatable driving member, a rotatable driven member, an elastic torque transmitting member connecting the driving and driven members, means for controlling the application of driving force to said driven member, a speed controlled actuator for said controlling means, and means responsive to the torque transmitted through said torque transmitting member for controlling said actuator.

WILLIAM C. McCOY.